United States Patent
Riedel

(10) Patent No.: US 10,320,909 B2
(45) Date of Patent: Jun. 11, 2019

(54) APPARATUS FOR CONTROLLING A PLURALITY OF APPLIANCES ABOARD A VEHICLE

(71) Applicant: Airbus Operations GmbH, Hamburg (DE)

(72) Inventor: Christian Riedel, Bliedersdorf (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/198,138

(22) Filed: Mar. 5, 2014

(65) Prior Publication Data

US 2014/0257600 A1 Sep. 11, 2014

Related U.S. Application Data

(60) Provisional application No. 61/773,265, filed on Mar. 6, 2013.

(30) Foreign Application Priority Data

Mar. 6, 2013 (DE) .................. 10 2013 203 841

(51) Int. Cl.
*H04L 29/08* (2006.01)
*G06F 9/52* (2006.01)
(52) U.S. Cl.
CPC ............. *H04L 67/12* (2013.01); *G06F 9/52* (2013.01); *G05B 2219/1215* (2013.01)
(58) Field of Classification Search
CPC .......................................... G05B 2219/1215
See application file for complete search history.

(56) References Cited

U.S. PATENT DOCUMENTS

| 5,854,591 A | 12/1998 | Atkinson |
| 7,496,666 B2 | 2/2009 | Bates et al. |
| (Continued) | | |

FOREIGN PATENT DOCUMENTS

| DE | 698 34 266 T2 | 1/2007 |
| DE | 10 2007 048 579 A1 | 4/2009 |

OTHER PUBLICATIONS

J.W.-K. Hong [et al]: Web-based intranet services and network management. In: Communications Magazine, IEEE, vol. 35, 1997, No. 10, p. 100-110. IEE Xplore [online]. DOI: 10.1109/35.623993, In: IEEE.

(Continued)

*Primary Examiner* — Lail A Kleinman
(74) *Attorney, Agent, or Firm* — Jenkins, Wilson, Taylor & Hunt P.A.

(57) ABSTRACT

An apparatus for controlling appliances aboard a vehicle, including a first data processing device having a network interface that can have a vehicle network for bidirectional data transmission between the first data processing device and connected network appliances. Also provided are an input/output device, a graphics processor device connected to the screen thereof and to the first data processing device, a user interface module provided in the first data processing device and that implements a graphical user interface having pages, and at least one separate second data processing device connected to the first data processing device via a separate bidirectional data link and having a network interface for connection to a vehicle network. Via each bidirectional data link it is exclusively possible to transmit predefined data records having data of predefined data types for display on pages from the second data processing device to the first data processing device.

14 Claims, 2 Drawing Sheets

(56) References Cited

U.S. PATENT DOCUMENTS

| | | |
|---|---|---|
| 8,065,463 B2 | 11/2011 | Porath et al. |
| 2004/0145612 A1 | 7/2004 | Kopitzke et al. |
| 2007/0057785 A1 | 3/2007 | Lee |
| 2007/0077998 A1 | 4/2007 | Petrisor |
| 2008/0312778 A1 | 12/2008 | Correa et al. |
| 2009/0119431 A1* | 5/2009 | Porath et al. ............... 710/110 |
| 2010/0057899 A1 | 3/2010 | Henkel |
| 2011/0004832 A1 | 1/2011 | Canal et al. |

OTHER PUBLICATIONS

German Search Report for Application No. 10 2013 203 841.0 dated Jul. 10, 2013.
Watkins, et al., "Transitioning from federated avionics architectures to Integrated Modular Avionics," IEEE/AIAA 26th Digital Avionics Systems Conference, DASC '07, IEEE, pp. 2.A.1-1-2.A.1-10, Oct. 1, 2007.
Fuchs, "The Evolution of Avionics Networks from ARINC 429 to AFDX," Proceedings of the Seminars Future Internet (FI), Innovative Internet Technologies and Mobile Communication (IITM) and Aerospace Networks (AN), Summer Semester 2012, Network Architectures and Services, pp. 65-76, Aug. 2012.
Extended European Search Report for European Application No. 14157462.4 dated May 12, 2017.
European Office Action for European Application No. 14157462.4 dated Jul. 10, 2018.

* cited by examiner

APPARATUS FOR CONTROLLING A PLURALITY OF APPLIANCES ABOARD A VEHICLE

CROSS-REFERENCE TO RELATED APPLICATIONS

This application claims priority to and the benefit of U.S. Provisional Patent Application Ser. No. 61/773,265 and to German Patent Application Serial No. DE 10 2013 203 841.0, both of which were filed Mar. 6, 2013, the entire disclosures of which are both incorporated by reference herein.

TECHNICAL FIELD

The present application relates to an apparatus for controlling a plurality of appliances aboard a vehicle and in particular an aircraft, wherein the apparatus comprises a first data processing device and at least one second data processing device, which can each have a network of an aircraft connected to them, and an input/output device for the output of data that are delivered by the data processing devices and for the input of data for the data processing devices. The application also relates to a vehicle, such as in particular an aircraft, which is equipped with such an apparatus.

BACKGROUND

Aboard vehicles and particularly aircraft, various electrical and electronic devices or appliances are provided for a wide variety of purposes. For example, in modern aircraft, these appliances are connected to networks via which they can send and receive appliance-specific data. For the monitoring and control of the appliances, apparatuses are provided that are likewise connected to the respective networks and are adapted to receive data from the appliances and to transmit data to the appliances. The apparatuses may have input/output devices by means of which data delivered by the appliances, possibly after processing or conditioning by the apparatuses, can be presented or displayed for a user and by means of which data can be input and then transmitted to the appliances for the purpose of modifying appliance settings or generally for the purpose of controlling said appliances.

An example of such apparatuses in aircraft is flight attendant panels or flight attendant control devices, which frequently have a touch-sensitive screen as an input/output device and are arranged in the aircraft cabin so as to be accessible to flight attendants.

The appliances controlled by an apparatus of the type mentioned above or the appliances with which an apparatus of the type mentioned above communicates during operation are generally in very different relationships with the safety of the aircraft. For example, some appliances, such as flight instruments or sensors for flight attitude or flight speed or airspeed, may be absolutely necessary for controlling and monitoring the flight operation, which means that failure thereof or faults therein can have disastrous effects right through to crashing. On the other hand, faults on other appliances do not have any influence on safety and, as in the case of an onboard entertainment system, for example, merely result in certain restrictions on the comfort of the passengers. There may be various further increments between these two extremes. By way of example, faults on appliances for controlling or monitoring cabin lighting, cabin temperature or heating can result in restrictions on safety but without having disastrous effects. A similar thing applies at another level for appliances that keep maintenance information or information about passengers, for example.

In aviation, the five so-called DAL (DAL stands for "Design Assurance Level") levels A to E have been defined for classifying appliances and software running thereon in respect of the safety requirements thereof and the severity of the effects of a possible failure. Level A comprises appliances whose failure has disastrous effects on the safety of the operation of the aircraft, and level E comprises appliances whose failure has no effects on the safety of the operation of the aircraft.

Even if one only considers the aircraft cabin, there are appliances associated with the cabin that are essential to cabin safety, such as various sensors and appliances for controlling the air supply or cabin communication appliances for transmitting announcements to the passengers, and appliances which are irrelevant to cabin safety, such as appliances of an onboard entertainment system, appliances for adjusting passenger seats or appliances that are part of the galley, or are less relevant, such as appliances for temperature control.

Due to the different safety requirements, it is necessary to ensure that an appliance having low safety requirements or a relatively low safety level cannot adversely affect an appliance having higher safety requirements or a higher safety level. This would be possible, however, if such appliances were connected to a shared network via which they are able to interchange data. In this connection, it is also of importance that increasingly the option is provided or at least desired for particular appliances brought aboard by passengers, such as notebooks or tablet computers, to be incorporated into an onboard network and to be able to access certain appliances, for example providing Internet access, under strict control. It must be excluded that with such passenger appliances an unauthorized access to aircraft systems can be made. In this case, it is also necessary to take into account the possibility that always exists for security gaps to be exploited by accomplished computer users.

Against this background, various networks that are separate in terms of hardware are provided for appliances having different safety requirements or different safety levels. This separation of the appliances on the basis of the safety requirements thereof is also referred to as splitting into different domains.

In order to maintain the separation of the various domains in apparatuses for controlling the appliances too, it is known practice for a plurality of data processing devices that are separate in terms of hardware to be provided in said appliances, each of said data processing devices being connected to a different one of the networks. The data processing device to which the appliances having the highest safety requirements are connected is able to communicate via unidirectional data lines with the other data processing devices, which in turn cannot communicate with one another.

All of these data processing devices have a respective own graphics processor device that the respective data processing device can use to output data on an input/output device that is shared by all data processing devices. For this purpose, the graphics processor devices of the different data processing devices are connected to a switch that respectively connects precisely one of the data processing devices to the common input/output apparatus. This data processing device then exclusively commandeers the input/output apparatus and, together therewith, operates essentially independently of the other data processing devices. In this regard, the switch is controlled exclusively by the data processing device to which the appliances having the highest safety requirements are connected, in order to ensure that this data processing device can always "take over" the input/output device in case it should be necessary.

On the one hand the described embodiment has the consequence that each data processing device must implement its own graphical user interface in order to be able to display and to manipulate data from the appliances connected thereto using the input/output device. Furthermore, although it is possible, due the unidirectional data lines, for the data processing device to which the appliances having the highest safety requirements are connected to provide, as part of the user interface implemented by said data processing device, a selection menu by means of which the user can effect changeover to one of the other data processing devices, an actually integrated and uniform graphical user interface having flexible data input options is, however, not possible. In addition, user-induced changeover or switching from one of the data processing devices to which appliances having relatively low safety requirements are connected to another data processing device using the graphical user interface is not possible on account of there being no possibilities of control of the switch or the other data processing devices. Instead, a separate changeover option needs to be provided outside the input/output device and the graphical user interfaces, which renders operation complicated and confusing for the user.

The above considerations also apply in corresponding fashion to vehicles other than aircraft.

SUMMARY

It is an object of the present invention to configure an apparatus of the type described for controlling appliances aboard a vehicle such that it is simpler and less expensive and provides a simpler and more flexible graphical user interface, and at the same time to meet the safety requirements.

This object is achieved by an apparatus having the features disclosed herein. Advantageous embodiments of the apparatus are disclosed herein.

The invention is explained in more detail below using an exemplary embodiment with reference to the appended figures.

DETAILED DESCRIPTION

Figure 1:
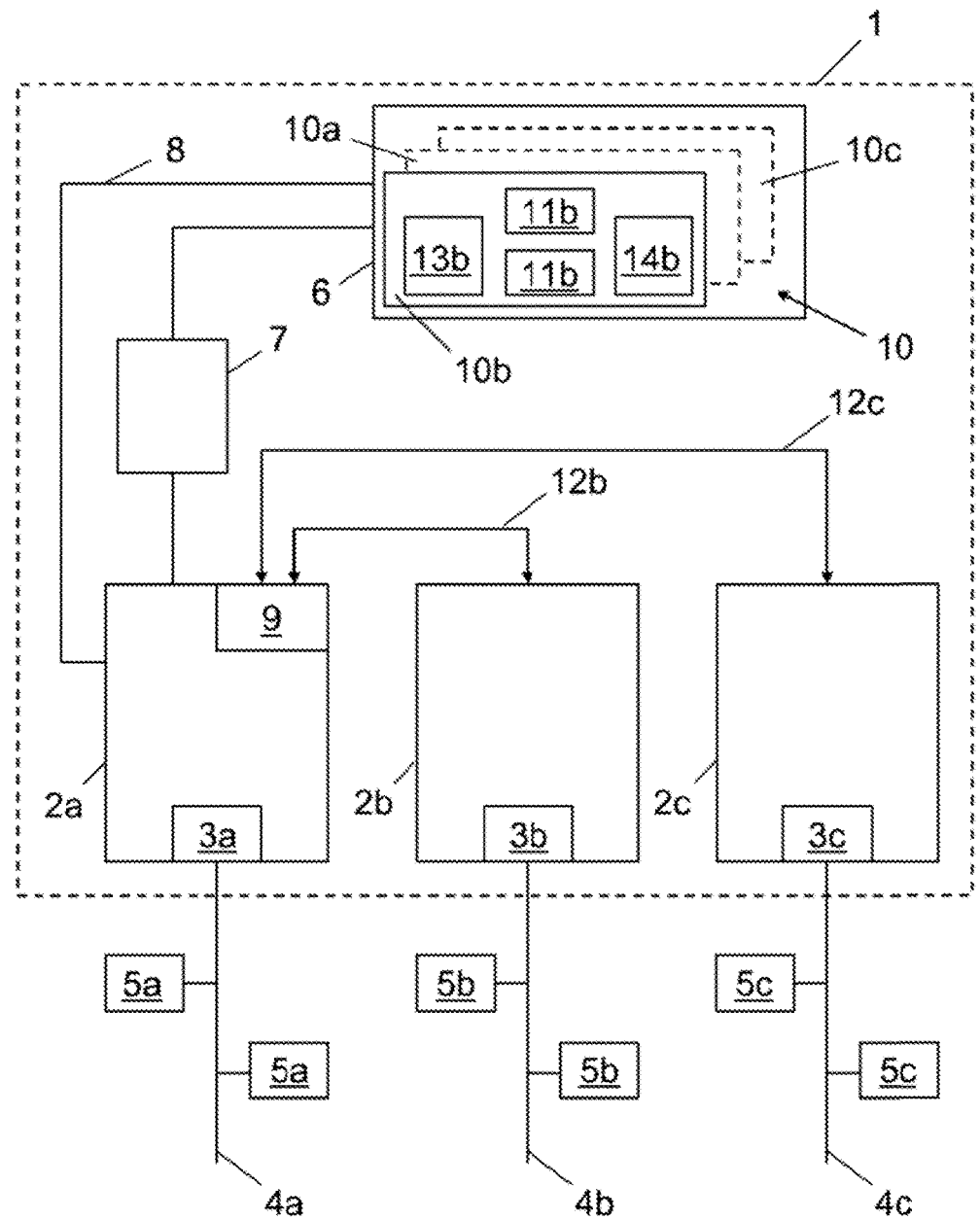
FIG. 1 shows an embodiment of an apparatus according to the invention for controlling a plurality of appliances aboard an aircraft in the form of a schematic block diagram.

According to the present invention, it is provided that an apparatus for controlling a plurality of appliances or devices aboard a vehicle and preferably an aircraft, which controlling also includes the display of data that are delivered by these appliances, comprises a first data processing device. This first data processing device comprises a network interface, such as, in particular, an Ethernet interface, which is configured and designed in such a manner that it can have a network of a vehicle connected to it and then, during operation, a bidirectional transmission of data between the first data processing device and appliances that are connected to this network is possible. In other words, the first data processing device is adapted by means of the network interface thereof to communicate with the corresponding appliances via such a network in order to control them, alter their settings or obtain appliance-specific data from them, for example.

The apparatus also comprises an input/output device having a screen as well as a graphics processor device or a graphics controller that is connected to the screen and to the first data processing device. The graphics processor device and the first data processing device are adapted such that the first data processing device can, during operation, control the graphics processor device to control the image displayed by the screen. There is preferably no provision or possibility for the graphics processor device to be controlled by other components of the apparatus or by external components.

In the first data processing device a user interface module is provided that is adapted to implement, during operation, a graphical user interface that is displayed on the screen and comprises a plurality of pages that are each adapted for the input and/or output of data. The user interface module may be embodied as a software and/or hardware module and, by way of example, may be an application that is executed during operation on the first data processing device. The implementation of the graphical user interface by the user interface module means that all elements of the graphical user interface, including the design of all pages, are stored in a memory of the first data processing device, which memory is associated with the user interface module. In other words, only the user interface module is responsible for the graphical user interface. This advantageously makes it possible that by only operating the input/output device a change between the various pages of the graphical user interface can be made. In particular, from any page of the graphical user interface any other page of the graphical user interface can be displayed by operating the input/output device—directly or possibly via the circuitous route of other pages.

The apparatus according to the invention further comprises, besides the first data processing device, one or more separate second data processing devices that are each embodied separately in terms of hardware. This means in particular that the first data processing device and each of the second data processing devices preferably each have an own processor and an own memory for storing data and programs.

Each such second data processing device is connected to the first data processing device via a—preferably separate—bidirectional data link via which, during operation, data can be transmitted between the first and the respective second data processing device. In addition, each such second data processing device, just like the first data processing device, comprises a respective network interface, such as, in particular, an Ethernet interface, that is designed and configured such that it can have a network of a vehicle and preferably of an aircraft connected to it and then, during operation, a bidirectional transmission of data between the respective second data processing device and appliances that are connected to the respective network is possible via it. In other words, each second data processing device is adapted by means of the network interface thereof to communicate via such a network with the corresponding appliances in order to control them, alter their settings or obtain appliance-specific data from them, for example.

The user interface module is designed and configured such that the pages of the graphical user interface include, for each of the at least one second data processing device, at least one page on which, during operation, when the page is displayed on the screen, data are presented that have been transmitted from the respective second data processing device via the corresponding bidirectional data link to the first data processing device, and/or data can be input that are subsequently transmitted from the first data processing device via the corresponding bidirectional data link to the respective second data processing device. In this regard, it is also possible for one and the same page to be configured for the output and/or input of data that are associated with different data processing devices.

During operation, different vehicle networks and preferably different aircraft networks of the type described in connection with the prior art are connected to the network interfaces of the first data processing device and each of the second data processing devices, wherein the network having the appliances having the highest safety requirements is connected to the network interface of the first data processing device.

In order to meet the above safety requirements in light of the bidirectional data links between the first data processing device and each of the second data processing devices, for each of the second data processing devices, the corresponding bidirectional data link is—in contrast to the prior art—designed and configured such that it is only possible to transmit via it from the respective second data processing device to the first data processing device predefined data records with data of predefined data types for display on pages of the graphical user interface. In other words, only data that are inserted into the data fields of one of a plurality of predefined data records and match the data types of the relevant data fields can be transmitted in this direction. Furthermore, these data records can hold only data that are intended for display on pages of the graphical user interface. In particular, it is impossible for the second data processing devices in this way to transmit control data for controlling the first data processing device. Each of the data records contains one or more data fields that preferably each have a predefined data type.

This configuration has the advantage that the entire graphical user interface is managed and implemented centrally and only the data that are output and input on the pages of the graphical user interface are transmitted between the first data processing device and the second data processing devices when needed. This results in greater flexibility and considerable simplification for the use of the graphical user interface, and the standardization or harmonization thereof is a simple matter, without impairing safety.

Furthermore, it is not necessary for the second data processing devices to have an own graphics processor device. Instead, a shared or common graphics processor device is used under the control of the first data processing device and the user interface module, said shared graphics processor device therefore also being able to be chosen to be more powerful. In contrast to the prior art described, the second data processing devices are incapable of independent operation in order to display data and pages from a graphical user interface on the input/output device.

In a preferred embodiment, the first data processing device is configured as a master and each second data processing device is configured as a slave. The first data processing device and the second data processing devices are then adapted such that each second data processing device is able and permitted to transmit via the respective bidirectional link one or more of the predefined data records to the first data processing device only after reception of a request from the first data processing device. This simplifies the data communication in particular against the background that different pages of the graphical user interface can require a data exchange with different ones of the second data processing devices.

In a preferred embodiment, the user interface module is designed and configured such that each page comprises a number of predefined fields, each of which is adapted for the output and/or input of data of a predefined data type. Further, the predefined data records comprise exclusively data records whose data fields each correspond to one or more of the fields of one or more of the pages. Preferably, a data field of a data record corresponds to precisely one field of a page, and following transmission of the data record to the first data processing device the content of the data field is displayed in this field of this page. Alternatively, it is also possible, however, for the first data processing device to be adapted to, after reception of data records, perform a data processing or combine the content of various data fields of one or more received data records, and to display processed or combined data in corresponding fields of the pages.

In a preferred embodiment, each second data processing device has, for the purpose of the transmission of the predefined data records via the respective bidirectional data link, a predetermined command or instruction set implemented in it, the commands or instructions of which can effect exclusively the transmission of the predetermined data records. Each of the bidirectional data links then has a device provided for it that is adapted to reject all commands or instructions sent by the respective second data processing device for data transmission via the data link that are not part of the predetermined command or instruction set or that infringe the syntax thereof. Such a device may also be provided for a plurality of or all the data links collectively. Such devices can be realized as a software module in the first data processing device and/or in one or more second data processing devices or as a hardware module that is provided in the first data processing device or one or more second data processing devices or as a separate module.

In a preferred embodiment, the apparatus is adapted such that the data fields of each of the predefined data records can assume exclusively values from a predetermined range. This condition may be part of the predetermined command or instruction set from the preceding embodiment, for example. Besides the stipulation of the data types, an additional safety against buffer overflows, for example, can be provided in this manner.

In a preferred embodiment, each second data processing device is adapted to fill, during operation, the data fields of the predefined data records that it transmits with values that it determines on the basis of data received via its network interface. In the simplest case, the data fields are filled without changes with data that the respective second data processing device receives from appliances via its network interface. By way of example, an appliance could be a temperature sensor that provides a temperature value that is then "forwarded" in a data record to the first data processing device. Alternatively, it is possible and, depending on the instance or case of application, preferred for the second data processing devices to be adapted to condition and process the data received via their network interface during operation. By way of example, it would thus be possible for temperature measurement values from various (redundant) sensors to be combined in order to minimize errors and for the combined measurement value to be "forwarded" in a data record to the first data processing device.

In a preferred embodiment, the user interface module is designed and configured such that, for all pages, each field into which data can be input is respectively associated with one or more of the second data processing devices. The first data processing device, and preferably in particular the user interface module, is then adapted to transmit, during operation, when data have been input on a page of the graphical user interface, the input data via the respective bidirectional data links to that second data processing device or those second data processing devices that is or are associated with the corresponding fields of the page. Finally, the second data processing devices are adapted to control, during operation, appliances that are connected to a network that is connected to the network interface of the respective second data processing device on the basis of the data that are received from the first data processing device. In this way, the control of the various appliances is realized in a particularly simple manner.

In a preferred embodiment, the input/output device is a touch-sensitive screen. In an alternative embodiment, the input/output device comprises an input device that is separate from the screen.

In a preferred embodiment, the first data processing device and the bidirectional data link between the first data processing device and each second data processing device are adapted such that the first data processing device can, during operation, transmit control commands for controlling the at least one second data processing device via the bidirectional data link. Control of the first data processing device is prevented by the limitation to transmission of the predefined data records in the opposite direction.

In a preferred embodiment, the first data processing device and the one or more second data processing devices are arranged in a single common housing.

The apparatus may preferably be a flight attendant panel or flight attendant control unit (FAP).

According to the invention there is also provides a vehicle and preferably an aircraft having an apparatus according to one of the embodiments described.

In a preferred embodiment, the vehicle and in particular the aircraft comprises at least two separate networks that each have a plurality of appliances connected to them that transmit and receive data via the respective network. Each of the networks is connected to the network interface of another one of the first data processing device and the at least one second data processing device, i.e. each of the networks is connected to a different data processing device. In this regard, appliances of the vehicle or aircraft that are relevant to operating safety or flight safety are—insofar as they are connected to one of the networks in the first place—connected exclusively to the network that is connected to the network interface of the first data processing device. By contrast, appliances of the vehicle or aircraft that are not relevant to operating safety or flight safety are—insofar as they are connected to one of the networks in the first place—connected exclusively to a network that is connected to the network interface of one of the second data processing devices. Preferably, the appliances are categorized into various safety levels in the manner explained above, and appliances having different safety levels or safety requirements are connected to different networks and hence also to different second data processing devices. This advantageously prevents not only adverse influencing of appliances having the highest safety level by other appliances but also overall, on account of the separation of the second data processing devices from one another, that appliances having one safety level are adversely influenced by appliances having a lower safety level.

For example, the vehicle or aircraft may have an onboard entertainment system, and appliances that are part of the onboard entertainment system are then connected to a network that is connected to the network interface of a second data processing device. By contrast, flight instruments, sensors and/or appliances in an onboard communication system of the vehicle or aircraft are connected to the network that is connected to the network interface of the first data processing device.

The apparatus 1 shown in FIG. 1, which is mounted in an aircraft that is not shown, has three separate data processing devices 2a, 2b and 2c, which may be, for example, separate computers or computer modules that are separate in terms of hardware on a shared mainboard. Each of the three data processing devices 2a, 2b and 2c has an Ethernet interface 3a, 3b and 3c, respectively, to which another Ethernet network 4a, 4b and 4c, respectively, of the aircraft is connected. These networks 4a, 4b, 4c can operate in particular on the basis of the AFDX standard. They each have a plurality of appliances 5a, 5b and 5c of the aircraft connected to them that are able to exchange via the associated Ethernet interface 3a, 3b and 3c, respectively, data with the corresponding data processing device 2a, 2b and 2c, respectively, in both directions.

The apparatus 1 also has a touch-sensitive screen 6 as an input/output device and a graphics processor 7 that is connected to the touch-sensitive screen 6 and is adapted in the usual manner to control the screen content that is displayed on the touch-sensitive screen 6 during operation.

The data processing device 2a differs from the other two data processing devices 2b and 2c in multiple respects.

On the one hand, the data processing device 2a, which can also be referred to as the first or superordinate data processing device, is connected to the graphics processor 7 as the only one of the data processing devices 2a, 2b and 2c and is adapted to control said graphics processor during operation. Hence, it is exclusively the data processing device 2a that ultimately determines the display on the touch-sensitive screen 6. The graphics processor 7 may also be integrated in the data processing device 2a.

Further, the data processing device 2a is connected (via the line 8) to the output portion of the touch-sensitive screen 6 as the only one of the data processing devices 2a, 2b and 2c. This means that exclusively the data processing device 2a can directly receive or accept data that are input by a user using the touch-sensitive screen 6.

Furthermore, the data processing device 2a, in contrast to the data processing devices 2b and 2c, which can also be referred to as second or subordinate data processing devices, has a user interface module 9 that is implemented in software or hardware. The user interface module 9 has a memory that stores all elements of a graphical user interface 10, and is adapted to prompt or cause the data processing device 2a during operation to control the graphics processor such that the graphical user interface 10 can be displayed and operated on the touch-sensitive screen 6. The graphical user interface 10 is managed completely by the user interface module 9, and the data processing devices 2b and 2c do not play any part in this connection.

The graphical user interface 10 has a plurality of, and in the example shown three, pages 10a, 10b and 10c, precisely one of which is displayed on the touch-sensitive screen 6 at a time. For the purposes of illustration, all three pages 10a, 10b and 10c have been shown in FIG. 1, with the pages 10a and 10c being shown in the background and in dashed lines in order to indicate that just the page 10b is displayed at the time under consideration and the pages 10a and 10c are not visible on the touch-sensitive screen 6. Each page 10a, 10b and 10c has a respective plurality of fields, which are shown only for the page 10b in FIG. 1 and bear the reference numeral 11b.

In the exemplary embodiment, the page 10a is associated with the data processing device 2a, the page 10b is associated with the data processing device 2b and the page 10c is associated with the data processing device 2c. Furthermore, the fields 11b of the data processing device 2b are each associated with precisely one other of the appliances 5b. A corresponding situation applies to the fields of the pages 10a and 10c. In the manner described below, following display of one of the pages 10a, 10b or 10c on the touch-sensitive screen 6, in each of the fields of the page in question precisely one appliance-specific value from another one of the appliances 5a, 5b and 5c, respectively, is displayed that are connected to the data processing device 2a, 2b and 2c, respectively, associated with the page.

The data processing device 2a is adapted to, after the page 10a has been displayed as prompted by the user interface module 9, use the Ethernet interface 3a to request or retrieve the appliance-specific values associated with the fields of the page 10a from the appliances 5a and to send them to the user interface module 9. The latter is in turn adapted to display the page 10a with the corresponding values in the fields of the page. By operating the touch-sensitive screen 6 and the page 10a of the graphical user interface, a user can change these values if needed. Each input or change is communicated to the data processing device 2a via the line 8, and the data processing device 2a is adapted to transmit such changed values via the Ethernet interface 3a to the relevant appliances 5a.

So that appliance-specific values of the appliances 5b and 5c that are connected to the data processing devices 2b and 2c, respectively, can be displayed on the pages 10b and 10c, these data processing devices are each connected via a bidirectional data line 12b and 12c, respectively, to the data processing device 2a and in particular to the user interface module 9 thereof. The data processing device 2a and the user interface module 9 thereof are adapted to send a control command via the line 12b and 12c, respectively, in order to notify the data processing device 2b and 2c, respectively, of when the page 10b and 10c, respectively, needs to be displayed. The data processing devices 2b and 2c are adapted to, following reception of such a control command, use their Ethernet interface 3b and 3c, respectively, to request or retrieve the appliance-specific values associated with the fields of the page 10b and 10c, respectively, from the appliances 5b and 5c, respectively, and to send them to the user interface module 9 in one of a plurality of predefined data records. Said user interface module is in turn adapted to display the page 10b and 10c, respectively, with the corresponding values in the fields of the page. A user can operate the touch-sensitive screen 6 and the page 10b and 10c, respectively, of the graphical user interface in order to change these values if needed. Any change is communicated to the data processing device 2a via the line 8, and the data processing device 2a is adapted to transmit such changed values via the user interface module 9 and the line 12b and 12c, respectively, to the data processing device 2b and 2c, respectively. The latter are in turn adapted to, following reception of changed values, transmit them via the Ethernet interface 3b and 3c, respectively, to the relevant appliances 5b and 5c, respectively.

Figure 2:
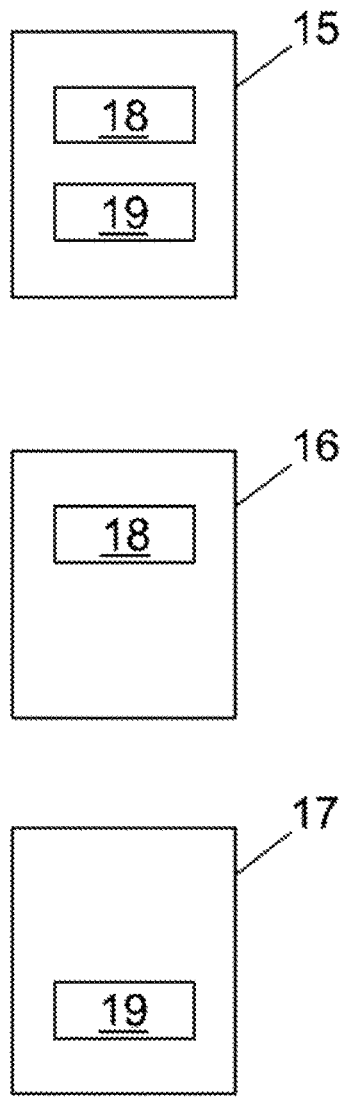
FIG. 2 schematically shows three predefined data records.

In FIG. 2 three predefined data records 15, 16 and 17 that are available to the data processing device 2b in order to transmit appliance-specific data via the line 12b to the user interface module 9 are schematically shown. The data record 15 contains precisely two data fields 18 and 19 that each have a predefined data type and may also be limited in terms of value range. For example, the data field 18 could be of floating point type, and the data field 19 could be of integer type. The data record 15 cannot hold other data types or additional data. The data record 16 contains only the data field 18, and the data record 17 contains only the data field 19. The data field 18 could be associated with one of the appliances 5b for holding a measurement value determined thereby, and the data field 19 could be associated with another one of the appliances 5b for holding a current setting value. The data processing device 2b is adapted to select and use, depending on whether these two appliances 5b are in operation or just one of the two, one of the data records 15, 16 and 17 for transmitting the appliance-specific data to the user interface module.

In the exemplary embodiment, suitable programming of the data processing devices 2b and 2c and of the user interface module 9 ensures that data transmissions from the data processing devices 2b and 2c to the user interface module 9 via the lines 12b and 12c that do not correspond to one of the predefined data records are rejected.

In addition to the data fields and possibly further operator control elements, the pages 10a, 10b and 10c each comprise buttons for navigating between the pages 10a, 10b and 10c. For example, the page 10b in the exemplary embodiment shown has buttons 13a and 14a in order to get to the preceding page 10a and to the next page 10c, respectively.

The central implementation of the graphical user interface in the user interface module 9 located in the data processing device 2a makes the graphical user interface and the operation thereof simple, uniform and consistent. In addition, changes to the graphical user interface and maintenance work are facilitated.

The invention claimed is:

1. An apparatus for controlling a plurality of appliances aboard a vehicle comprising a first data processing device that comprises a network interface that is designed and configured such that it can have a network of a vehicle connected to it and then, during operation, a bidirectional transmission of data is possible via it between the first data processing device and appliances that are connected to this network, an input/output device comprising a screen,
a graphics processor device that is connected to the screen and to the first data processing device and, during operation, is controlled by the first data processing device to control the image displayed by the screen,
a user interface module that is provided in the first data processing device and is adapted to implement, during operation, a graphical user interface that is displayed on the screen and comprises a plurality of pages between which it is possible to change by operating the input/output device and that are each adapted for the input and/or output of data, and
at least one separate second data processing device, each of which lacks a graphics processor device and is not connected directly to the graphics processor device that is connected to the screen, and each of which
is connected to the first data processing device via a separate bidirectional data link, via which, during operation, data can be transmitted between the first and the respective second data processing device,
wherein the bidirectional data link is configured such that data can be transmitted from the first data processing device to the second data processing device as well as from the second data processing device to the first data processing device, and comprises a network interface that is adapted such that it can have a network of a vehicle connected to it and then, during operation, a bidirectional transmission of data is possible via it between the respective second data processing device and appliances that are connected to the respective network, wherein the user interface module is designed and configured such that the pages of the graphical user interface comprise, for each of the at least one second data processing device, at least one page on which, during operation, when the page is displayed on the screen, data are presented that have been transmitted from the respective second data processing device via the corresponding bidirectional data link to the first data processing device, and data can be input that are subsequently transmitted from the first data processing device via the corresponding bidirectional data link to the respective second data processing device, and for each of the at least one second data processing device, the corresponding bidirectional data link is designed and configured such that it is only possible to transmit via it predefined data records comprising data of predefined data types for display on pages of the graphical user interface from the respective second data processing device to the first data processing device, wherein in each of the at least one second data processing device a predetermined instruction set is implemented in it for transmission of the predefined data records via the respective bidirectional data link, the instructions of which instruction set can cause exclusively the transmission of the predetermined data records, and in which for each of the bidirectional data links a device is provided that is adapted to reject all instructions sent by the respective second data processing device for data transmission via the data link that are not part of the predetermined instruction set or that infringe the syntax thereof, and the graphics processor device, during operation, is controlled exclusively by the first data processing device to control the image displayed by the screen so that the first data processing device ultimately determines the image displayed on the screen, and all elements of the graphical user interface implemented by the user interface module are stored in a memory of the first data processing device that is associated with the user interface module.

2. The apparatus according to claim 1, wherein the first data processing device is designed and configured as a master and the at least one second data processing device is designed and configured as a slave, wherein the first data processing device and the at least one second data processing device are adapted such that the at least one second data processing device can transmit one or more of the predefined data records to the first data processing device only after reception of a request from the first data processing device.

3. The apparatus according claim 1, wherein the user interface module is designed and configured such that each page comprises a number of predefined fields, each of which is adapted for the output and/or input of data of a predefined data type, and in which the predefined data records comprise exclusively data records whose data fields each correspond to at least one of the fields of at least one of the pages.

4. The apparatus according to claim 1, wherein the device comprises a software module in the first data processing device and/or in the at least one second data processing device or as a hardware module that is provided in the first data processing device or the at least one second data processing device or as a separate module.

5. The apparatus according to claim 1, wherein the data fields of each of the predefined data records can assume exclusively values from a predetermined range.

6. The apparatus according to claim 1, wherein the at least one second data processing device is adapted to fill the data fields of the predefined data records that it transmits with values that it determines on a basis of data received via its network interface.

7. The apparatus according to claim 1, wherein the user interface module is designed and configured such that, for all pages, each field into which data can be input is respectively associated with one or more of the at least one second data processing device, the first data processing device is adapted to transmit, during operation, when data have been input on a page of the graphical user interface, the input data via the respective bidirectional data links to that or those of the at least one second data processing device that is or are associated with the corresponding fields of the page, and the at least one second data processing device is adapted to control, during operation, appliances that are connected to a network that is connected to the network interface of the respective second data processing device on a basis of the data that are received from the first data processing device.

8. The apparatus according to claim 1, in which the input/output device is a touch-sensitive screen or in which the input/output device comprises an input device that is separate from the screen.

9. The apparatus according to claim 1, in which the first data processing device and the bidirectional data link between the first data processing device and the at least one second data processing device are adapted such that the first data processing device can, during operation, transmit control commands for controlling the at least one second data processing device via the bidirectional data link.

10. The apparatus according to claim 1, in which the first data processing device and the at least one second data processing device are arranged in a shared housing.

11. The apparatus according to claim 1, which is a flight attendant panel.

12. An aircraft comprising an apparatus according to claim 1 and at least two separate networks that each have a plurality of appliances connected to them that transmit and receive data via the respective network, wherein each of the networks is connected to the network interface of another one of the first data processing device and the at least one second data processing device and wherein appliances of the aircraft that are relevant to flight safety are connected exclusively to the network that is connected to the network interface of the first data processing device, and appliances of the aircraft that are not relevant to flight safety are connected exclusively to a network that is connected to the network interface of the at least one second data processing device.

13. The aircraft according to claim 12, which comprises an onboard entertainment system and in which appliances that are part of the onboard entertainment system are connected to a network that is connected to the network interface of the at least one second data processing device.

14. The aircraft according to claim 12, in which flight instruments, sensors and/or appliances of an onboard communication system of the aircraft are connected to the network that is connected to the network interface of the first data processing device.

\* \* \* \* \*